United States Patent [19]

Rosa et al.

[11] 4,366,532

[45] Dec. 28, 1982

[54] AC/DC OR DC/AC CONVERTER SYSTEM WITH IMPROVED AC-LINE HARMONIC REDUCTION

[75] Inventors: John Rosa, Pittsburgh; Raymond J. Radus, Monroeville, both of Pa.

[73] Assignee: Westinghouse Electric Corp., Pittsburgh, Pa.

[21] Appl. No.: 262,726

[22] Filed: May 11, 1981

[51] Int. Cl.³ .................. H02M 7/08; H02M 7/17
[52] U.S. Cl. ................................. 363/69; 363/45; 363/90; 363/129
[58] Field of Search .............. 363/34, 35, 37, 44–48, 363/69, 70, 64, 90, 92, 129

[56] References Cited

U.S. PATENT DOCUMENTS

| | | | |
|---|---|---|---|
| 2,036,844 | 4/1936 | Willis | 363/64 |
| 2,044,593 | 6/1936 | Sabbah | 363/64 |
| 2,082,015 | 6/1937 | Ludwig et al. | 363/64 |
| 2,340,098 | 1/1944 | Zühlke | 363/69 X |
| 3,745,437 | 7/1973 | Brown | 363/45 |
| 4,208,709 | 6/1980 | Garnham et al. | 363/90 |

*Primary Examiner*—A. D. Pellinen
*Attorney, Agent, or Firm*—C. M. Lorin

[57] ABSTRACT

In a transformer-rectifier converter system, at least one inductance is inserted in the commutation path of two adjacent diode or thyristor devices in a cluster of three devices related to a common DC polarity pole, the reactance due to such inductance being sufficient to lengthen the commutation overlap thereby to minimize AC line harmonics. The invention is applicable to AC/DC as well as to DC/AC conversion.

9 Claims, 5 Drawing Figures

A VOLTAGE ACROSS D1

B VOLTAGE ACROSS D3

C VOLTAGE ACROSS X

D VDC (EXTENDED TIME SCALE)

E VOLTAGE ACROSS X (EXTENDED TIME SCALE)

AC/DC OR DC/AC CONVERTER SYSTEM WITH IMPROVED AC-LINE HARMONIC REDUCTION

BACKGROUND OF THE INVENTION

The invention relates to the reduction of harmonic currents drawn from the AC supply lines by static converters. Current-fed static converter systems consist of a rectifying circuit connected either directly to the AC power lines or to the secondary of an interposed transformer. In high power converter systems an array of rectifier devices, diodes or thyristors, are connected to the multi-phase lines or to multiple secondary windings of polyphase transformers, in order to reduce DC ripple, and curtail harmonic AC line currents. This invention is concerned with the reduction of harmonics present in the currents drawn by the converter system from the AC supply lines.

It is known that the theoretical amplitude of the harmonic currents, expressed as percents of the fundamental current, is:

$$I_h = 100/h\%$$

where $$h = kp \pm 1;$$

h being the harmonic order number, p the pulse number of the converter and k any positive integer.

For applications allowing moderate harmonic distortion, a six-pulse converter, i.e. having a pulse number p=6, is generally selected. In such case, the harmonics present are those of order h=5, 7, 11, 13, 17, 19, 23, 25, etc. with the corresponding harmonic amplitudes $I_h$. More demanding harmonic requirements can be met with converters having a pulse number p=12, resulting in the cancellation of every other harmonic pair of the six pulse circuits, thus leaving the harmonics of order h=11, 13, 23, 25, etc. present in the AC line currents. The amplitudes of such harmonics, however, remain unchanged.

Higher pulse numbers are also possible, resulting in the cancellation of further harmonics, but the amplitudes of the remaining harmonics are unchanged.

If these amplitudes are objectionable, the circuit designer has two alternatives depending on the degree of harmonic reduction required: filtering or adding commutation reactances. A high degree of reduction (typically, over an order of magnitude) necessitates the use of filter traps, generally tuned to individual harmonic frequencies and mounted across the AC terminals of the converter. A moderate amount of reduction (about 70% at h=11, 13; even more for a higher order) can be accomplished by increasing the commutation reactances in the converter system. It has been demonstrated that the larger the commutation reactances, the greater the reduction of the amplitudes of all harmonics present relative to the theoretical amplitude $I_h$.

The most plausible way of increasing the commutation reactances is by way of selecting a converter transformer of high leakage reactance. The degree of harmonic reduction obtainable in this way, however, is limited because of transformer design constraints. Also, the larger the transformer leakage reactances, the larger the possible mismatch between commutation reactances, which can result in non-theoretical low frequency distortion. Since a converter of p pulse number has 2p effective commutation reactances, this approach would substantially increase the likelihood of a mismatch.

SUMMARY OF THE INVENTION

In a static converter connected between polyphase AC lines and two DC terminals commutation reactances of sufficient value to reduce AC line current harmonics are provided by inserting in circuit with the rectifier devices inductances on each polarity side.

This is achieved by equally distributing the inductances among all commutating branches or by forming a single magnetic flow path crossed in alternating directions by each successive branch of the commutating current path, or by arranging the rectifier devices in two opposite commutation groups under a common polarity pole and straddling the two groups of one pole with a sufficient inductance, the associated DC terminal being a center tap thereof.

DESCRIPTION OF THE PREFERRED EMBODIMENT

Figure 1:
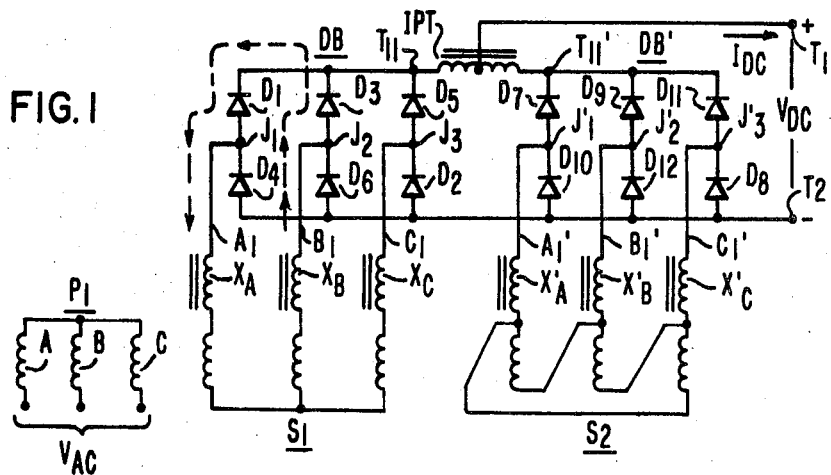
FIG. 1 shows a 12-pulse delta-wye transformer-rectifier system provided with commutating reactances in accordance with the present invention.

Referring to FIG. 1 the invention is illustrated by commutation reactances ($X_A$, $X_B$, $X_C$) and ($X'_A$, $X'_B$, $X'_C$) inserted according to the invention in a conventional 12-pulse delta-wye rectifier system. The transformer connected to the three phases A, B, C of the AC power lines $V_{AC}$ typically comprises a set of primary windings $P_1$ connected in Y and two sets of secondary windings $S_1$, $S_2$, one ($S_1$) in Y, the other ($S_2$) in delta configuration.

Secondary windings $S_1$ are connected via lines $A_1$, $B_1$, $C_1$ to the three junction points ($J_1$, $J_2$, $J_3$) between diodes of a six-diode bridge DB operatively connected between the terminals $T_{11}$, $T_2$. Secondary windings $S_2$ are connected via lines $A_1'$, $B_1'$, $C_1'$ to the three junction points ($J'_1$, $J'_2$, $J'_3$) between diodes of a second six-diode bridge DB' operatively connected between terminals $T_{11}'$, $T_2$. Thus, in bridge DB, assuming a current-fed inverter system, diodes ($D_4$, $D_1$) are oriented from DC terminal $T_2(-)$ to bridge terminal $T_{11}(+)$ with $J_1$ being the junction point. In bridge DB' diodes ($D_{10}$, $D_7$) are similarly oriented from DC terminal $T_2(-)$ to bridge terminal $T_{11}'(+)$ with $J'_1$ being the junction point. Positive bridge terminals $T_{11}$ and $T_{11}'$ are interconnected via an interphase transformer IPT which absorbs the ripple voltage difference between the two bridges and combines the two phase displaced 6-pulse outputs of DB and DB' into a 12-pulse output at its centertap connected to the positive DC terminal $T_1$.

In accordance with the present invention, identical commutation reactances $X_A$, $X_B$ and $X_C$ are inserted in lines $A_1$, $B_1$, $C_1$ between windings $S_1$ and corresponding junction points J$_1$, J$_2$, J$_3$, whereas identical commutation reactances X'$_A$, X'$_B$ and X'$_C$ are inserted in lines A$_1$', B$_1$', C$_1$' between secondary windings S$_2$ and corresponding junctions points J'$_1$, J'$_2$, J'$_3$.

In operation, the effect of commutation reactances X$_A$, X$_B$, X$_C$, X'$_A$, X'$_B$, X'$_C$ is as follows: The sequential order of conduction in bridge DB is D$_1$-D$_2$, D$_3$-D$_2$, D$_3$-D$_4$, D$_5$-D$_4$, D$_5$-D$_6$, D$_1$-D$_6$, while in bridge DB', the sequential order of conduction is D$_7$-D$_8$, D$_9$-D$_8$, D$_9$-D$_{10}$, D$_{11}$-D$_{10}$, D$_{11}$-D$_{12}$, D$_7$-D$_{12}$.

Figure 2:
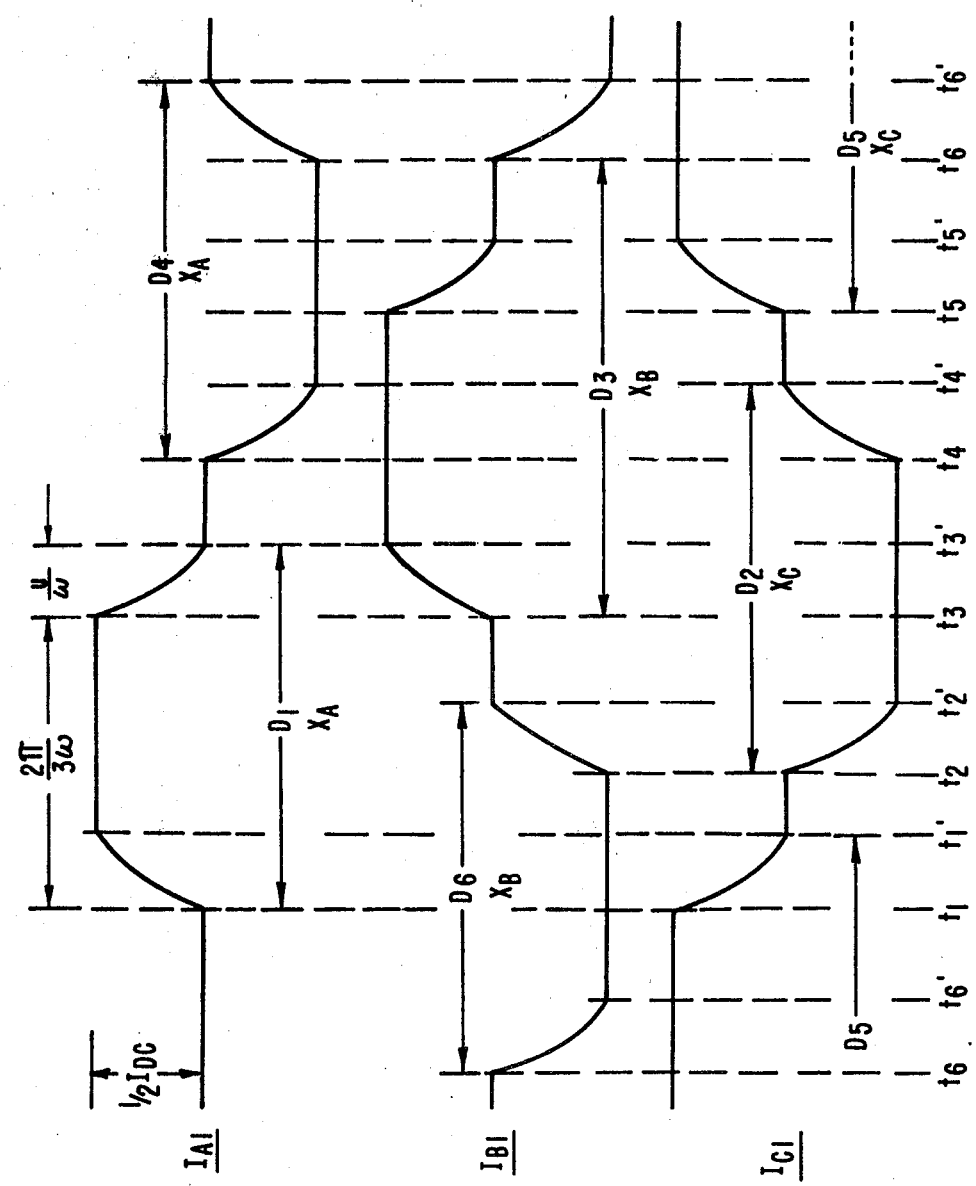
FIG. 2 illustrates with curves the effect of the commutating reactances according to the invention on the stepped current characteristic of the current-fed converter bridge of FIG. 1.

The corresponding AC currents I$_{A1}$, I$_{B1}$, I$_{C1}$ flowing lines A$_1$, B$_1$, C$_1$ feeding bridge DB are illustrated in FIG. 2. As is known from the theory of operation of diode and thyristor converters (for instance see Schaefer: Rectifier circuits, Wiley, FIG. 5.1 p. 57 and chapter 5 pages 55 to 59; 1965), the amplitude of the AC current in this particular circuit is $\frac{1}{2}$I$_{DC}$ where I$_{DC}$ is the DC current delivered to the load. The duration of conduction of each rectifier diode is 2$\pi$/3$\omega$ plus an additional time interval, marked u/$\omega$ in FIG. 2, where $\omega$ is the angular frequency of the AC supply. Interval u/$\omega$ is the so-called commutation overlap resulting from the fact that the start of conduction in one rectifying device (D$_3$ at time t$_3$ in FIG. 2) does not coincide with the termination of conduction in the previously conducting device (D$_1$ at t$_3$' in FIG. 2). Due to the presence of inductance X$_A$ in line A$_1$, of inductance X$_B$ in line B$_1$, and the presence of leakage reactances in windings S$_1$, the current I$_{B1}$ in device D$_3$, starting to flow at time t$_3$, cannot instantly rise to the full amplitude $\frac{1}{2}$I$_{DC}$. Full amplitude is reached only at time t$_3$'=t$_3$+u/$\omega$. For the same reason, the current I$_{A1}$ in D$_1$, starting to decline at time t$_3$ (when D$_3$ starts to conduct), cannot instantly drop to zero. Zero is reached at the same instant, t$_3$, at which I$_{B1}$ reaches full amplitude (at all instances, I$_{A1}$+I$_{B1}$=$\frac{1}{2}$I$_{DC}$). The time interval between t$_3$ and t$_3$' is u/$\omega$, the so-called commutation overlap. The same can be said regarding the other combination of phases B$_1$, C$_1$ and C$_1$, A$_1$ for converter DB and regarding phases A$_1$', B$_1$', C$_1$' in converter DB'. It is known from the referenced theory of operation that the greater the reactances involved, the longer the commutation overlap and the gentler and slower the rise and decline of the current pulses. It is also known, that a slower rise and decline of the AC current results in a reduction of the harmonic content of the waves.

The AC line harmonic reduction method just described is applicable to all converters, including those using thyristors instead of the diodes D$_1$-D$_6$, D$_7$-D$_{12}$ illustrated in FIG. 1.

It is observed that the reactors according to the invention are characterized by an inductance sufficient to result in the desired reduction of AC line current harmonics. Indeed, inserting inductances into the AC lines of converter circuits is not new. In this regard, however, the amount of inductance required according to the present invention is much higher than would be necessary in the conventional use as part of a snubber network where it would be intended merely to limit dv/dt and di/dt, for instance, in relation to a commutating thyristor.

Figure 3:
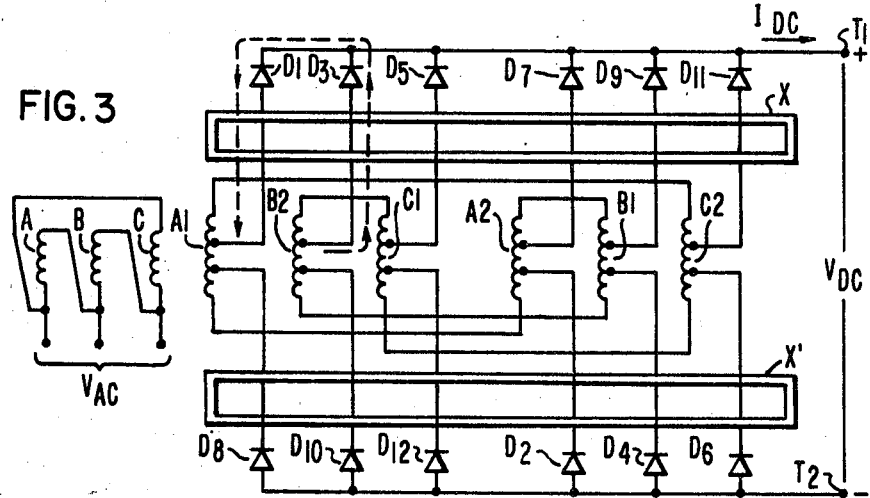
FIGS. 3 and 4 show two different arrangements of commutating reactances inserted according to the invention in a prior art hexagon transformer-rectifier system of the 12-pulse type.

Another embodiment of the invention is illustrated by FIG. 3, where on each polarity side a single reactor core is used for AC line harmonic reduction to introduce a sufficient inductance in the commutating path of each six-pulse commutating group of a 12-pulse rectifying system in which two groups of six rectifier devices are connected to taps regularly distributed on six secondary windings coupled in pairs (A$_1$, A$_2$, B$_1$, B$_2$, C$_1$ and C$_2$). The secondary windings are coupled with primary windings A, B, C which are delta-connected. Such an arrangement has been disclosed in U.S. Pat. No. 4,255,784 issued Mar. 10, 1981 to John Rosa. For the purpose of this disclosure, the John Rosa patent is hereby incorporated by reference.

Referring again to FIG. 3, the diodes of odd number D$_1$, D$_3$, D$_5$, D$_7$, D$_9$, D$_{11}$, are connected to the positive DC terminal T$_1$ and to successive taps of windings A$_1$, B$_2$, C$_1$, A$_2$, B$_1$, C$_2$, respectively, whereas, the diodes of even number D$_8$, D$_{10}$, D$_{12}$, D$_2$, D$_4$, D$_6$ are connected to the negative DC terminal T$_2$ and to successive taps of windings A$_1$, B$_2$, C$_1$, A$_2$, B$_1$, C$_2$, respectively. With this arrangement, in one group D$_3$ commutates D$_1$ when D$_2$ is the conducting diode of the opposite group, and D$_4$ commutates D$_2$ once D$_3$ has become the conducting diode of the first group and so on.

The reactors according to the invention are single magnetic core inductive devices, X for the T$_1$ terminal and X' for the T$_2$ terminal. The core provides inductive coupling between the respective parallel conductors. When a single diode is conducting in each group (says, D1 in the positive group and D2 in the negative group) only one conductor is involved through each core, (one on each polarity side). Therefore, reactors X and X' have no effect. When commutation takes place in one group, say, D3 commutates D1 in the positive group, while in the other group, D2 is conducting on the negative side, (the commutating path is as shown by the arrow in FIG. 3), the respective conductors through the core of X are coupled in such a way that the rates of change of currents through D$_1$ and D$_3$ are adding their effects. Thus, in accordance with the present invention, for each of the diodes related to a common terminal, the single conductor through the window of X (or X') is passed in a direction alternatively opposite from one conductor to the subsequent conductor. The result is to give with a single core and six conductors the same effect as six cores of two turns each. With this approach the result is obtained in a much simpler manner and it is less costly. This is made possible by the fact that any two diodes under commutation are adjacent diodes, such as D$_1$, D$_3$ (or D$_2$, D$_4$ for the other polarity), in the sequential order of conduction, while the other diodes in the same group are in the blocking state. Hence the two leads of the diodes in conduction during commutation, for instance D$_1$, D$_3$ (or D$_2$, D$_4$) represent a two-turn winding in reactor X (or X') with the positive terminal (or negative terminal) acting as a "center tap," while the other leads do not carry any current.

Instead of forming with the conductor a single turn around the magnet core X, or X', as in FIG. 3, it is possible to form a multi-turn winding thereby increasing the inductance. It is also possible to stack several cores in the same fashion as shown by the single closed magnetic path X, or X'. In such case, it is advantageous to make toroidal stampings with an air gap slot. For a low-voltage high-current converter application, the single turn feed-through reactance, such as illustrated in FIG. 3, would be preferred.

Figure 4:
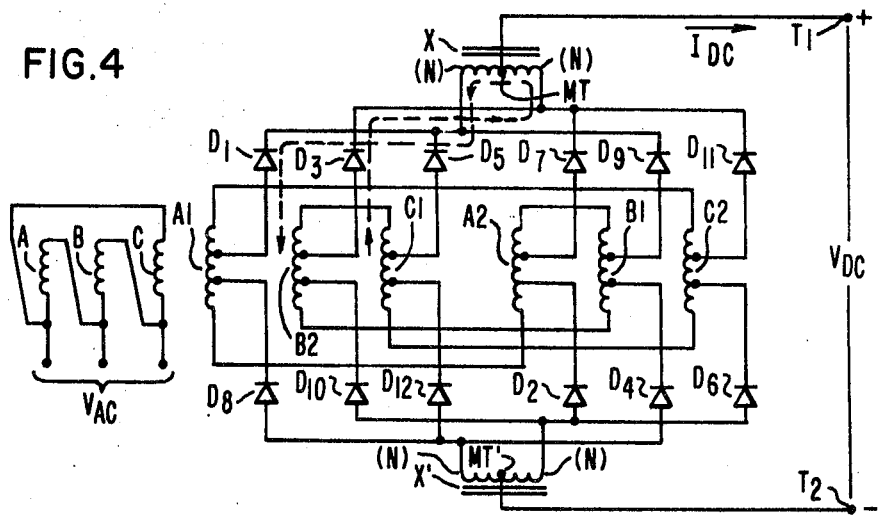

Referring to FIG. 4, another embodiment of the invention is shown in the context of the 12-pulse rectifying system of the aforementioned incorporated by reference Rosa patent. AC line harmonic reduction in accordance with the present invention is provided by dividing the six rectifier devices of a common polarity side into two clusters of three rectifying devices in such a way that the diodes of the same cluster never conduct simultaneously, whereas one diode in one cluster will commutate a diode in the other cluster for the same polarity and vice-versa. The reactance (X, or X') is now so connected between such paired clusters of three diodes as to straddle both clusters while having the associated terminal connected to a midtap thereof (MT or MT'). In FIG. 4, the commutation path from diode $D_3$ commutating diode $D_1$ through reactor X inserted between junctions $J_1$, $J_2$ of the respective clusters ($D_1$, $D_5$, $D_9$), ($D_3$, $D_7$, $D_{11}$) is indicated by an arrow. Reactor X, when in circuit between diodes $D_1$ and $D_3$ operates, like in the instance of FIG. 3, to extend the duration of the commutation overlap and thereby to reduce harmonic distortion. It is observed that commutation of diode $D_1$ by $D_3$ (i.e. conduction by $D_1$ is taken over by $D_3$) on the positive side with respect to windings $A_1$, $B_2$ is concurrent with normal conduction of diode $D_2$ on the opposite polarity side (winding $A_2$), whereas at the next stage, $D_3$ being the only conducting diode on one polarity side (winding $B_2$), diode $D_2$ will be commutated by diode $D_4$ (winding $B_1$), and so on. Thus, reactances X and X' are alternatively effective in reducing harmonic distortion.

Regarding reactor X (or X') shown in FIG. 4 as reactors with two windings of N turns about a midtap, it appears that in this instance, the two reactor windings being closely coupled, an economical use of the magnetic circuit is accomplished. The total reactance is proportional to the square of the sum of the turns $(2N)^2$ while the maximum excitation and peak flux density of the core is determined by $NI_{DC}$ for N turns. Again, multiple turn windings wound on a gapped core can be used. The two clusters of three rectifiers must be isolated from each other.

Instead of diodes, thyristors might be used with the converter system, of FIGS. 3 and 4, and the commutating reactances X and X' would be applicable in exactly the same way.

Figure 5:
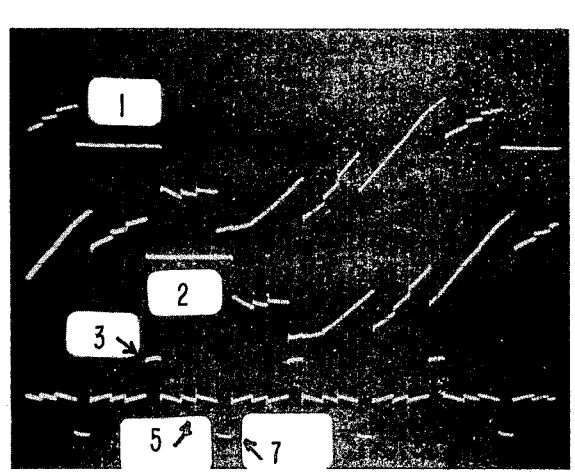
FIG. 5 illustrates with curves showing the voltages across the rectifying device and inductance, the effect of reactances according to the present invention.
Figure 5:
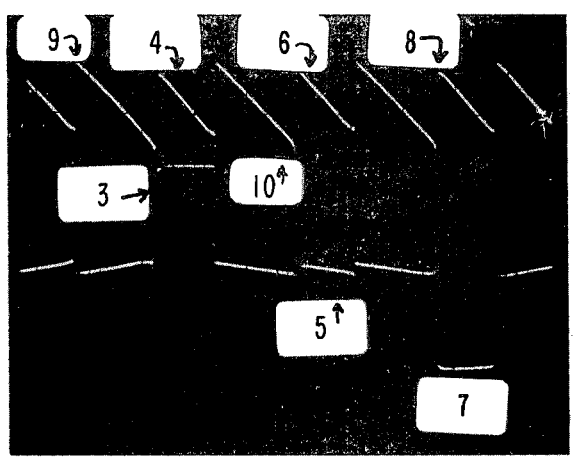

Referring to FIG. 5, oscillograms are given to illustrate the operation of the commutating reactors X, X' of FIG. 4. These oscillograms were taken on a thyristor converter, employing thyristors in positions $D_1$ through $D_{12}$ and gated at about 60° firing angle. The horizontal portion (1) of trace A indicates the conduction interval of thyristor $D_1$; the horizontal portion (2) of trace B indicates the conduction interval of thyristor $D_3$ which commutates $D_1$. During the commutation overlap, while both thyristors such as $D_1$ and $D_3$ are conducting, reactor X supports the transformer's line-to-line voltage as indicated by segment (3) of trace C and trace E, which is identical with C but has an extended time scale. The resultant DC output voltage segment (4) in trace D lies halfway between segment (9) resulting from the commutated device, like $D_1$ conducting alone and segment (10) resulting from the commutating device like $D_3$ conducting alone in the upper group. The ripple (5) in traces C and E indicates a similar commutation in the lower commutation group involving reactor X' resulting in output voltage segment (6) of trace D. The next commutation event in the upper group occurs when $D_5$ commutates $D_3$ as evidenced by the voltage supported by X at (7) in trace C and E and the corresponding output voltage segment (8) in the trace D. The duration of the commutation overlap, i.e., the width of intervals (3), (5), (7), etc. and thereby the degree of reduction of harmonic distortion of AC line currents, is determined by the product $I_{DC}X$.

More generally, the invention is applicable to AC/DC conversion as well as to DC/AC conversion.

The three embodiments of the invention just described by reference to FIGS. 1, 3 and 4, respectively, are only illustrative of preferred embodiments. For instance, the converter system of FIG. 1 does not have to include a transformer, or it may have two transformers. Moreover, any winding combination can provide two three-phase systems at 30° to one another, vectorially. Also, the inductances as shown in FIG. 4 are in the form of single reactors X, X' having a center tap at MT, MT'. It is understood that this is a matter of choice. Thus, in analogy to separate inductances—such as $X_A$, $X_B$, $X_C$ in FIG. 1, or those represented by the combination of two consecutive conductors in relation to commutating devices ($D_1$, $D_3$) in FIG. 3, and a common core (X or X'), reactors X and X' of FIG. 4—instead of being formed by two magnetically coupled windings, the inductances (X or X') of FIG. 4 could be two separate reactors having a junction point at MT, or MT'.

We claim:

1. In a converter system for interconnecting three-phase AC power lines with two direct current (DC) terminals including:

three primary windings connected to said three-phase AC power lines;

two three-phase secondary windings forming two three-phase voltage systems at 30° phase shift to one another;

six pairs of series-connected rectifying devices connected between said two DC terminals;

one set of three of said pairs of rectifying devices having respective middle points connected to one of said secondary windings and the other set of three of said pairs of rectifying devices having respective middle points connected to the other of said secondary windings;

one interphase reactor being connected between said two sets of rectifying devices;

said rectifying devices being equally distributed between the phases of said secondary windings and operatively conducting in sequential order between said two DC terminals;

said devices commutating one another in successive order from one secondary winding phase to the next;

a plurality of inductances operatively coupled each between one secondary winding and a corresponding middle point between rectifying devices;

said inductances being operative in pairs with the commutating currents of two such successive commutating devices;

one inductance of a pair associated with one of said two such successive commutating devices, the other inductance of a pair associated with the other of said two such successive commutating devices, to reduce the rate of change of the commutating current in both commutating devices, thereby to extend the duration of the attending commutation period, and to reduce the harmonics of the currents drawn from said AC power lines.

2. In a converter system interconnecring AC lines with two direct current (DC) terminals; the converter system including 4n rectifying devices equally distributed about a series of 4n phase voltages distributed according to a regular polygonal vectorial representation;

one set of 2n of said rectifying devices being associated with one DC terminal, a second set of 2n of said rectifying devices being associated with the other DC terminal;

said rectifying devices becoming operatively conducting between said DC terminals in sequential order and commutating one another in successive order from one phase voltage to the next; the combination of:

two inductors associated respectively with said two sets of rectifying devices, each inductor forming two inductances in relation to two commutating devices of the associated set, such two inductances being effective to reduce the rate of change of the commutating currents in both of said commutating devices, thereby to extend the duration of the attending commutation period and reduce the harmonics of the currents drawn from said AC lines.

3. The converter system of claim 2 with each device having a conductor portion for carrying current therethrough when the device is conducting;

each inductance being formed in each set of devices by the associated conductor portion and a magnetic core common to all conductor portions of such set of devices.

4. The converter system of claim 3 with said common magnetic core in each set of devices and said conductor portions being so related that the currents in the conductor portions of two successive commutating devices are adding their magnetizing effects.

5. The converter system of claim 4 with said common magnetic core in each set of devices forming at least one closed magnetic path.

6. The converter system of claim 5 with said AC lines having three phases and six windings, said windings being arranged to provide two groups of symmetrical six phase voltages, each group being at 30° with respect to the other, and said two plurality of devices being associated with respective groups of voltages.

7. The converter system of claim 2 with said 2n rectifying device of a set being divided into two clusters of n devices, the two successive commutating devices in one set belonging to two different clusters of the same set, the pair of inductances associated with one set of rectifying devices having a junction point joined to one corresponding DC terminal, the other pair of inductances associated with the other set of rectifying devices having a junction point joined to the other corresponding DC terminal;

each pair of two inductances straddling two clusters of rectifying devices in a corresponding set.

8. The converter system of claim 7 with the inductances of a pair being magnetically coupled and having a center tap as said junction point.

9. The converter system of claim 8 with said AC lines having three phases and six windings, said windings being arranged to provide two groups of symmetrical six phase voltages, each group being at 30° with respect to the other, and said two sets of devices being associated with respective groups of voltages.

* * * * *